Nov. 1, 1955      W. G. TOLAND, JR      2,722,473

PRODUCTION OF POLYSULFIDES

Filed March 21, 1952

INVENTOR
WILLIAM G. TOLAND, JR.
BY
ATTORNEYS

United States Patent Office 2,722,473
Patented Nov. 1, 1955

2,722,473

PRODUCTION OF POLYSULFIDES

William G. Toland, Jr., San Rafael, Calif., assignor to California Research Corporation, San Francisco, Calif., a corporation of Delaware Application March 21, 1952, Serial No. 277,766

6 Claims. (Cl. 23—134)

This invention relates to a process for producing polysulfides by the reaction of a sulfate with a sulfide in an aqueous medium.

It has been found that polysulfides can be produced in high yield by heating a water-soluble sulfate, a water-soluble sulfide, and water to a temperature above 550° F. under a superatmospheric pressure sufficient to maintain a part of the water in liquid phase. In a preferred embodiment of the invention, ammonium sulfate, hydrogen sulfide, and water are heated to about 620° F. for a period of about 15 minutes under a pressure of about 3000 p. s. i. g. The sulfate and sulfide react to form ammonium polysulfide. A substantial stoichiometric excess of hydrogen sulfide is desirably employed in order to produce a reaction product having a low content of unreduced sulfate.

The polysulfide reaction product may be decomposed to produce elemental sulfur and a continuous process may be operated in which the only materials consumed are hydrogen sulfide and air. The equations for such a continuous process are as follows:

1. $4H_2S + (NH_4)_2SO_4 \rightarrow (NH_4)_2S_5 + 4H_2O$
2. $(NH_4)_2S_5 + H_2SO_4 \rightarrow (NH_4)_2SO_4 + H_2S + 4S$
3. $H_2S + 2O_2 \rightarrow H_2SO_4$

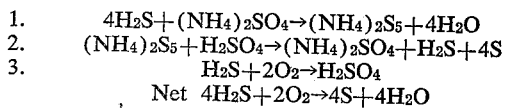

Pursuant to the equations, a part of the hydrogen sulfide is oxidized to sulfuric acid and the remainder of it is oxidized to ammonium polysulfide; the sulfuric acid and the ammonium polysulfide are then reacted to liberate elemental sulfur as the end product.

Instead of decomposing the polysulfide product by adding sulfuric acid as illustrated above, it may be decomposed by depressuring the reaction product mixture while it is at a temperature above about 400° F. In the depressuring, elemental sulfur is precipitated and ammonium sulfide is removed overhead and oxidized to ammonium sulfate for reuse in the process. The equations for the process conducted in this manner are as follows:

1. $4H_2S + (NH_4)_2SO_4 \rightarrow (NH_4)_2S_5 + 4H_2O$
2. $(NH_4)_2S_5 \rightarrow (NH_4)_2S + 4S$
3. $(NH_4)_2S + 2O_2 \rightarrow (NH_4)_2SO_4$

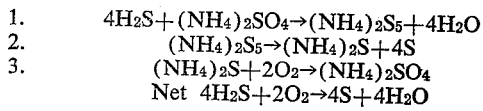

The ammonium sulfide is oxidized to ammonium sulfate by air at about 220° F. under 150 pounds pressure, as described in Ephriam's "Inorganic Chemistry," 5th ed., page 588.

Figure 1:
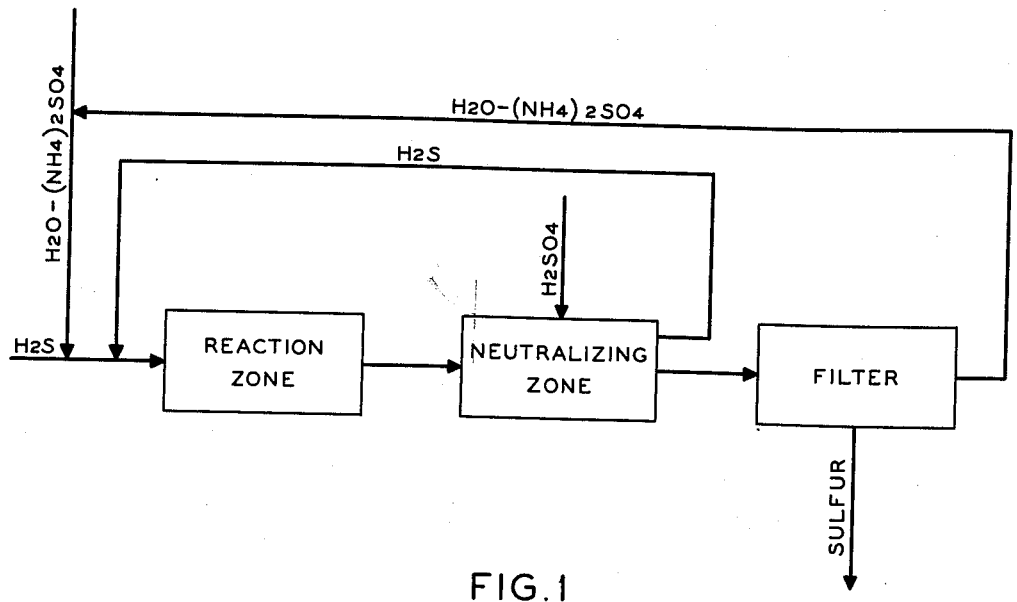
Figure 2:
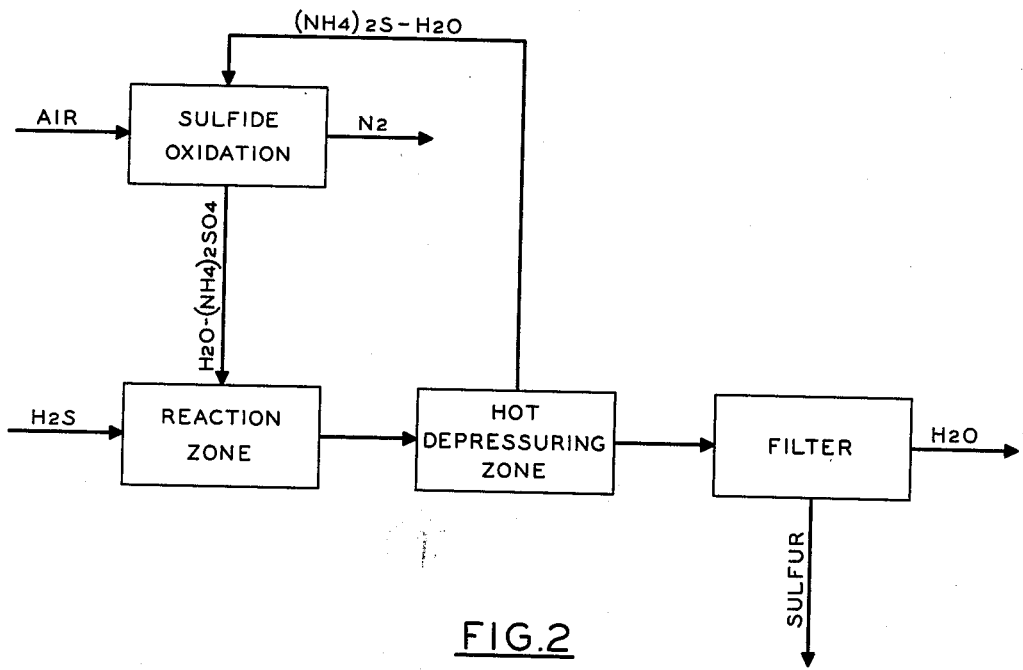

Figures 1 and 2 of the appended drawings illustrate the production of polysulfides pursuant to the invention and decomposition of the polysulfide to elemental sulfur which is recovered as the end product as described above. Pursuant to Figure 1, a stoichiometric excess of hydrogen sulfide and aqueous ammonium sulfate are passed into a reaction zone maintained at a temperature above 550° F. and under a superatmospheric pressure sufficient to maintain a part of the water in liquid phase. A residence time of about 15 minutes of the reactants in the reaction zone suffices to effect substantially complete reduction of the sulfate. The reaction product is then passed to a neutralizing zone where sulfuric acid is added. The sulfuric acid liberates hydrogen sulfide which may be recycled to the reaction zone or removed for oxidation to sulfuric acid. The neutralized reaction product comprising elemental sulfur and aqueous ammonium sulfate is filtered or decanted to remove the sulfur as a solid product. Aqueous ammonium sulfate is recycled to the reaction zone.

Pursuant to Figure 2, hydrogen sulfide and aqueous ammonium sulfate are contracted in a reaction zone at a temperature above 500° F. and under a superatmospheric pressure sufficient to maintain a part of the water in liquid phase. The hot reaction product is passed into a depressuring zone where it is depressured while at a temperature above 400° F. and desirably while at about reaction temperature. Hydrogen sulfide, ammonium sulfate and water escape from the depressuring zone as vapors and, upon cooling, form an aqueous solution of ammonium sulfide. This solution is passed into the sulfide oxidation zone and oxidized with air at about 100° C. under about 10 atmospheres pressure to produce ammonium sulfate which is then passed into the reaction zone. The depressuring is so conducted that a part of the water remains in the depressuring zone in liquid phase. A slurry of elemental sulfur and water is withdrawn from the depressuring zone and filtered to separate elemental sulfur. The aqueous filtrate ordinarily contains small amounts of unreduced ammonium sulfate. This filtrate is desirably accumulated and evaporated to concentrate the ammonium sulfate which may be returned to the reaction zone.

Sulfates in general may be used as the sulfate component of the reaction mixture, but ammonium sulfate and the sulfates of the first three main groups of the Periodic Table are especially useful. Thus, ammonium sulfate, especially potassium sulfate, sodium sulfate, barium sulfate, calcium sulfate, magnesium sulfate and aluminum sulfate can be effectively employed in the reaction. Of these sulfates, ammonium sulfate is preferred because it is very much more readily and rapidly reduced by the sulfide component of the reaction mixture than the other sulfates. Mixtures of ammonium sulfate and another sulfate, for example, aluminum sulfate, may desirably be employed as the sulfate component of the reaction mixture.

Any water-soluble sulfide may be employed as the sulfide component of the reaction mixture. Hydrogen sulfide, ammonium sulfide, the alkali metal sulfides, and the alkaline metal earth sulfides are all effective as the sulfide component of the reaction mixture. It is preferred to employ hydrogen sulfide as the sulfide component of the reaction mixture since it is readily available as a by-product of petroleum refining. Sour gas streams produced in petroleum refineries such as methane, ethane, or propane, or mixtures of these gases containing substantial amounts of hydrogen sulfide, may be employed as the sulfide component of the reaction mixture. The hydrogen sulfide reacts with the sulfate to form polysulfide and the hydrocarbon gases, especially methane and ethane, come through the reaction sweetened and substantially unchanged, especially if the reaction time be kept short.

Temperatures above about 550° F. should be employed in order that polysulfide formation proceeds at a useful rate. Below 550° F., the reaction proceeds very slowly. The reaction is conducted at a temperature below the critical temperature of water and preferably in the range about 600 to 700° F., in which range substantially complete reduction of the sulfate component can be obtained with a contact time of 15 minutes or less.

The reaction is conducted under a superatmospheric pressure sufficient to maintain a part of the water in liquid phase. The pressure is ordinarily in the range 1000 to 4000 p. s. i. g.

The reaction may be conducted batch-wise in a bomb or autoclave, or it may be conducted continuously in a coil reactor in which a suitable back pressure is maintained on the reactance.

The following examples illustrate the production of polysulfides and elemental sulfur pursuant to the invention.

*Example 1*

464 g. of ammonium sulfate, 960 cc. of water, and 208 g. of hydrogen sulfide were charged to a 2.5 liter autoclave. The autoclave was sealed and heated with constant shaking to 600° F. As the temperature was raised, the pressure was observed to be 3075 p. s. i. g. at 575° F., 2975 p. s. i. g. at 601° F., and 2050 p. s. i. g. at 597° F. after the mixture had been held at 600° F. for 80 minutes The autoclave was cooled and the gases were bled off. The reaction product was filtered to remove sulfur. The filter cake consisting of elemental sulfur weighed 110 g. The filtrate was a solution of ammonium polysulfide suitable for use as the polysulfide component in most polysulfide reactions without any purification. To determine polysulfide content, the filtrate was steam stripped to precipitate sulfur from the ammonium polysulfide contained in it. After steam stripping, the filtrate was refiltered and an additional 105.6 g. of elemental sulfur were recovered.

*Example 2*

214 g. of sodium sulfate, 960 cc. of water, and 204 g. of hydrogen sulfide were charged to a 2.5 liter autoclave which was sealed and heated with constant shaking to 620° F. The reaction mixture was held at 620° F. for 15 minutes. The autoclave was cooled, the reaction mixture was removed and filtered. Upon decomposing the sodium polysulfide contained in the reaction product, 23.6 g. of elemental sulfur were recovered.

*Example 3*

1 mol of calcium sulfate, 1000 cc. of water, and 200 g. of hydrogen sulfide were charged to an autoclave. This mixture was treated as in Example 2. The reaction product mixture was filtered to separate unreacted calcium sulfate as a filter cake and a filtrate containing calcium polysulfide in solution. The filtrate was acidified with hydrochloric acid. Hydrogen sulfide was released and elemental sulfur was precipitated by decomposition of the polysulfide.

*Example 4*

½ mol of aluminum sulfate, 1000 cc. of water, and 200 g. of hydrogen sulfide were charged to an autoclave which was sealed and heated with constant shaking to about 600° F. The reaction mixture was held at about 600° F. for about 20 minutes. The autoclave was cooled and opened. The cold reaction mixture contained aluminum polysulfide which was decomposed forming hydrogen sulfide and elemental sulfur by addition of hydrochloric acid.

*Example 5*

1 mol of barium sulfate, 1000 cc. of water, and 200 g. of hydrogen sulfide were charged to a 2.5 liter autoclave which was sealed and heated with constant shaking to about 625° F. The reaction mixture was held at this temperature for about 15 minutes. The autoclave was cooled, and opened. The reaction product mixture was filtered to remove unreacted barium sulfate as a filter cake and to recover a filtrate containing barium polysulfide. Barium polysulfide was decomposed by adding concentrated hydrochloric acid to the filtrate. Hydrogen sulfide and elemental sulfur were formed.

As a result of a number of experiments carried out, it was determined that aluminum sulfate is very much more reactive than the metallic sulfates in the process of the invention. Of the metallic sulfates, aluminum sulfate was the most reactive followed, in order of decreasing reactivity, by potassium sulfate, barium sulfate, magnesium sulfate, calcium sulfate, and sodium sulfate.

I claim:

1. A process for producing polysulfides which comprises heating an inorganic sulfate, a water-soluble inorganic sulfide, and water to a temperature above 550° F. under a superatmospheric pressure sufficient to maintain a part of the water in liquid phase.

2. The process as defined in claim 1, wherein the sulfate, sulfide, and water are heated to a temperature in the range 550 to 700° F.

3. A process for producing ammonium polysulfide which comprises heating ammonium sulfate, a water-soluble inorganic sulfide, and water to a temperature in the range 550 to 700° F. under a superatmospheric pressure sufficient to maintain a part of the water in liquid phase.

4. The method as defined in claim 3, wherein the sulfide is hydrogen sulfide.

5. A process for producing alkali metal polysulfides which comprises heating an alkali metal sulfate, a water-soluble inorganic sulfide, and water to a temperature above 600° F. under superatmospheric pressure sufficient to maintain a part of the water in liquid phase.

6. The method as defined in claim 5, wherein the sulfide is hydrogen sulfide.

References Cited in the file of this patent

UNITED STATES PATENTS

| | | |
|---|---|---|
| 586,567 | Schenk | July 20, 1897 |
| 1,492,489 | Sutherst | Apr. 29, 1924 |
| 1,656,563 | Koppe | Jan. 17, 1928 |
| 1,813,497 | Koppe et al. | July 7, 1931 |

FOREIGN PATENTS

| | | |
|---|---|---|
| 323,919 | Great Britain | Jan. 16, 1930 |

OTHER REFERENCES

Mellor: "Treatise on Inorganic and Theoretical Chemistry," (1930) vol. 10, page 129 and vol. 2, page 653.